(12) United States Patent  (10) Patent No.: US 7,486,264 B2
Taguchi                    (45) Date of Patent:     Feb. 3, 2009

(54) LIQUID CRYSTAL DISPLAY AND LIQUID CRYSTAL DISPLAY DRIVING METHOD

(75) Inventor: Minoru Taguchi, Ise (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 464 days.

(21) Appl. No.: 11/070,240

(22) Filed: Mar. 3, 2005

(65) Prior Publication Data

US 2005/0195671 A1      Sep. 8, 2005

(30) Foreign Application Priority Data

Mar. 4, 2004   (JP) ............................. 2004-061408

(51) Int. Cl.
    *G09G 3/36*    (2006.01)
(52) U.S. Cl. .............................. 345/87; 345/89; 345/92; 345/100; 345/102
(58) Field of Classification Search .................. 345/87, 345/89, 92, 94, 100, 690, 204, 102, 98, 99, 345/82, 84, 76, 90, 104; 315/167, 168; 365/203
    See application file for complete search history.

(56) References Cited

U.S. PATENT DOCUMENTS

| 6,307,532 B1 * | 10/2001 | Aoki ............................. 345/94 |
| 6,545,657 B2 * | 4/2003 | Aoki ............................. 345/94 |
| 6,873,313 B2 * | 3/2005 | Washio et al. ................ 345/100 |
| 6,914,587 B2 * | 7/2005 | Kosaka ......................... 345/89 |
| 7,050,036 B2 * | 5/2006 | Kim et al. .................... 345/100 |
| 7,088,311 B2 * | 8/2006 | Kasai ............................ 345/51 |
| 2001/0033261 A1 * | 10/2001 | Washio et al. ................. 345/87 |
| 2002/0024482 A1 | 2/2002 | Song et al. |
| 2002/0024486 A1 * | 2/2002 | Aoki ............................ 345/87 |
| 2002/0105492 A1 * | 8/2002 | Kosaka ........................ 345/89 |
| 2003/0058199 A1 * | 3/2003 | Kasai ............................ 345/76 |
| 2003/0080932 A1 | 5/2003 | Konno et al. |
| 2003/0128180 A1 * | 7/2003 | Kim et al. .................... 345/100 |
| 2003/0151570 A1 * | 8/2003 | LeChevalier et al. .......... 345/84 |
| 2005/0001806 A1 * | 1/2005 | Ohmura ....................... 345/92 |
| 2005/0057580 A1 * | 3/2005 | Yamano et al. ............. 345/690 |
| 2005/0140625 A1 * | 6/2005 | Kim et al. ..................... 345/89 |
| 2006/0279523 A1 * | 12/2006 | Nitta et al. ................... 345/102 |

FOREIGN PATENT DOCUMENTS

| JP | 60-134293 | 7/1985 |
| JP | 10-232651 | 9/1998 |
| JP | 2002-91403 | 3/2002 |
| JP | 2003-131635 | 5/2003 |
| WO | WO 2005/057545 | 6/2005 |

* cited by examiner

*Primary Examiner*—Prabodh M Dharia
(74) *Attorney, Agent, or Firm*—Harness, Dickey & Pierce, P.L.C.

(57) ABSTRACT

Data (gray scale levels of source driver output) of two lines are compared between an actually charged line and a pre-charged line for which actual charging and pre-charging are carried out, respectively, during the same horizontal period. Based on the result of comparison, a pre-charged period of the pre-charged line is adjusted by adjusting a pulse width of a gate driver output. In this way, the pre-charge period is reduced and thereby overcharge is avoided in pixels which are likely to be overcharged by the pre-charging.

8 Claims, 9 Drawing Sheets

LIQUID CRYSTAL DISPLAY AND LIQUID CRYSTAL DISPLAY DRIVING METHOD

This Nonprovisional application claims priority under 35 U.S.C. § 119(a) on Patent Application No. 61408/2004 filed in Japan on Mar. 4, 2004, the entire contents of which are hereby incorporated by reference.

FIELD OF THE INVENTION

The present invention relates to a liquid crystal display that carries out "gate-jumping two-pulse-driving."

BACKGROUND OF THE INVENTION

In recent years, a resolution of TFT (Thin Film Transistor) liquid crystal displays is getting finer and finer. In this environment surrounding the TFT liquid crystal display, the available charge time for pixels, which can be regarded as a kind of a capacitor, is getting shorter. Such conditions often lead to situations where a sufficient amount of charge necessary for intended gray scale display cannot be obtained. The liquid crystal display also has a drawback that response speed is slow.

One method to solve such problems is to supply a gate driver output not only to the TFTs of a line being charged but also to the TFTs of the line two lines ahead of the target line, so as to pre-charge a liquid crystal pixel of the line two lines ahead of the target line prior to actual charging (hereinafter referred to as "gate-jumping two pulse driving"), as disclosed in Japanese Laid-Open Patent Publication 134293/1985 (Tokukaisho 60-134293, published on Jul. 17, 1985). Further, in Japanese Laid-Open Patent Publication 232651/1998 (Tokukaihei 10-232651, published on Sep. 2, 1998), it is proposed to delay a start timing of transmitting a gate output according to rounding of a source driver output in the "gate-jumping two pulse driving."

Applying this method, it is possible to compensate for inadequate charging resulting from the improved resolution of the TFT liquid crystal display and the higher driving frequency. A response speed of the TFT liquid crystal display can also be improved.

However, in the "gate-jumping two pulse driving," the conventional structures mentioned above have a problem of uneven gray scale display due to overcharging. A specific example of this is explained below.

Figure 8:
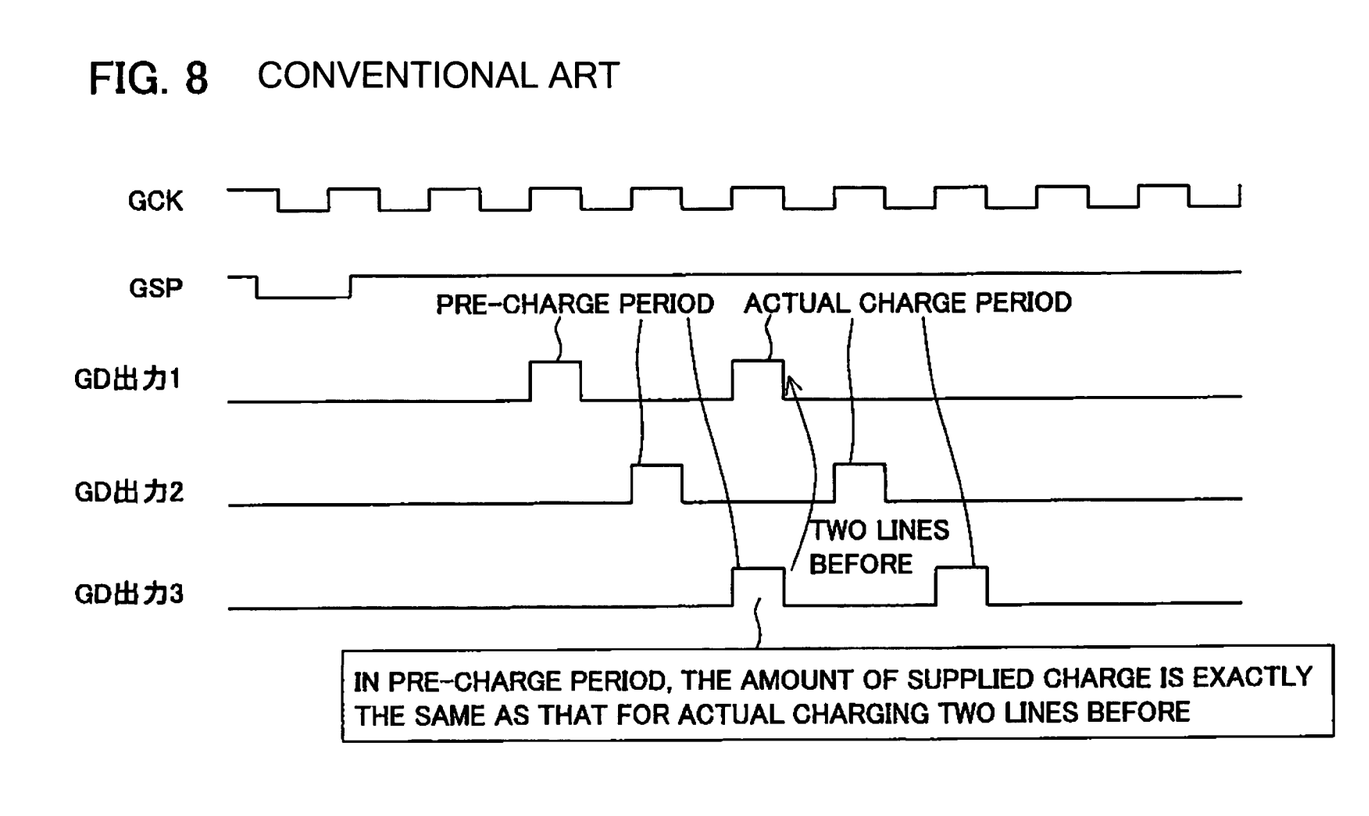
FIG. 8 is a timing chart representing an operation of conventional "gate-jumping two pulse driving."

As shown in FIG. 8, in the conventional "gate-jumping two pulse driving," exactly the same charge is supplied to the actually charged line and pre-charged line, when pre-charging is carried out on TFT liquid crystal pixels by jumping one line from the actually charged line. This is because an actually charged pixel and a pre-charged pixel both lie on the same source line, which makes it impossible to charge a pixel of the actually charged line with the data of an intended gray scale level, and at the same time pre-charge a pixel of the pre-charged line on the same source line with data of a similar gray scale level.

Figure 9:
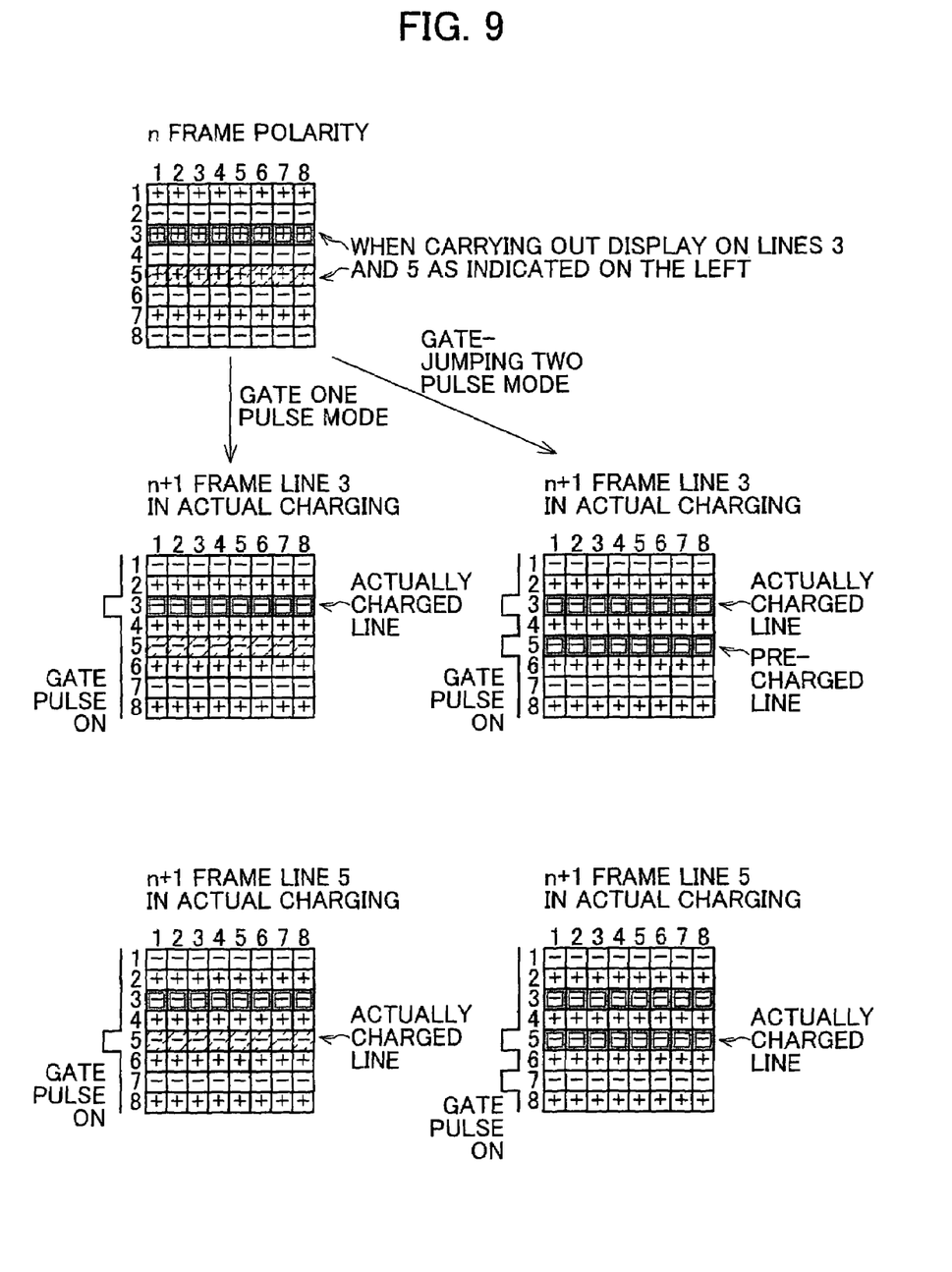
FIG. 9 is a diagram illustrating a principle by which a problem of a conventional "gate-jumping two pulse driving" is caused

When the gray scale display intended for the actually charged line has a gray scale level that requires a higher charge voltage than a gray scale level of the gray scale display intended for the pre-charged line two lines before the actually charged line, the pre-charging inevitably overcharges a liquid crystal pixel of the pre-charged line more than the intended level, as illustrated in FIG. 9. Note that, in a gate one pulse mode in which each pixel is charged only by actual charging without carrying out pre-charging, each line can be charged according to an intended gray scale level, and no overcharge occur. As such, normal gray scale level display is possible.

In the "gate-jumping two pulse driving," the overcharged line by the pre-charging needs to attain an intended charge level in the actual charge period by discharging the excess charge gained by the pre-charging. However, in reality, due to the ON characteristics of the TFT, it is not always possible to discharge the excess charge. As a result, the resulting gray scale display becomes look nearly the same as the one displayed in the previous line two lines before, i.e., a gray scale level completely different from the intended level is displayed.

Because of these problems, the "gate-jumping two pulse driving" has not come into practical use, though it is effective in improving a resolution and response speed of the TFT liquid crystal display in TFT liquid crystal driving.

SUMMARY OF THE INVENTION

It is an object of the invention to provide a liquid crystal display that can carry out "gate-jumping two pulse driving," which is effective in preventing uneven gray scale display caused by overcharge in pre-charging, and in improving a resolution and response speed of the liquid crystal display.

To accomplish the object above, the present invention provides a liquid crystal display in which actual charging for a current line and pre-charging for a subsequent line of the current line are carried out during one horizontal period, and the liquid crystal display includes: a pre-charge period adjusting section for comparing data respectively applied to the actually charged line and the pre-charged line which are charged in the same horizontal period, and adjusting a pre-charge period of the pre-charged line based on a result of the comparison.

As mentioned above, in a driving method in which actual charging for a current line and pre-charging for a subsequent line (any line following the actually charged line) are carried out during one horizontal period, a pixel is charged twice by pre-charging and actual charging. Though the driving method is effective in improving a resolution and response speed of the liquid crystal display in TFT liquid crystal driving, it can cause uneven gray scale display by the overcharge due to pre-charging.

To solve the problem, in the structure mentioned above, data respectively applied to the actually charged line and the pre-charged line which are charged in the same horizontal period are compared (a charge level of pre-charging and a charge level of actual charging are compared with respect to the same pixel), and a pre-charge period of the pre-charged line is adjusted based on the result of comparison. To be precise, the adjustment of a pre-charge period reduces the pre-charge period and thereby avoid overcharge in pixels which are likely to be overcharged by pre-charging. This effectively improves a resolution and response speed of the liquid crystal display while preventing uneven gray scale display caused by overcharge due to pre-charging.

To accomplish the object mentioned above, the present invention provides a liquid crystal display in which actual charging of a current line and pre-charging of a subsequent line of the actually charged line are carried out during one horizontal time, wherein two kinds of clock signals, a first clock signal for setting an actual charge period for each line, and a second clock signal for setting a pre-charge period for each line, are used to drive a gate line, and wherein a pulse width of the second clock signal is adjusted for every driving of a gate line, so as to bring about a corresponding change in the pre-charge period.

With the structure mentioned above, the charge period is controlled by using different gate clock signals for the actually charge line and pre-charged line of the same horizontal period. Thus, the amount of charge for the actually charged pixel and pre-charged pixel connected to the same source line can be independently controlled without increasing the number of source lines. This is effective in improving a resolution and response speed of the liquid crystal display while preventing uneven gray scale display caused by overcharge due to pre-charging.

For a fuller understanding of the nature and advantages of the invention, reference should be made to the ensuing detailed description taken in conjunction with the accompanying drawings.

DESCRIPTION OF THE EMBODIMENTS

An exemplary embodiment of the present invention is explained below referring to the attached drawings. First, referring to FIG. 2, an exemplary system structure of a liquid crystal display embodying the present invention is explained.

Figure 2:
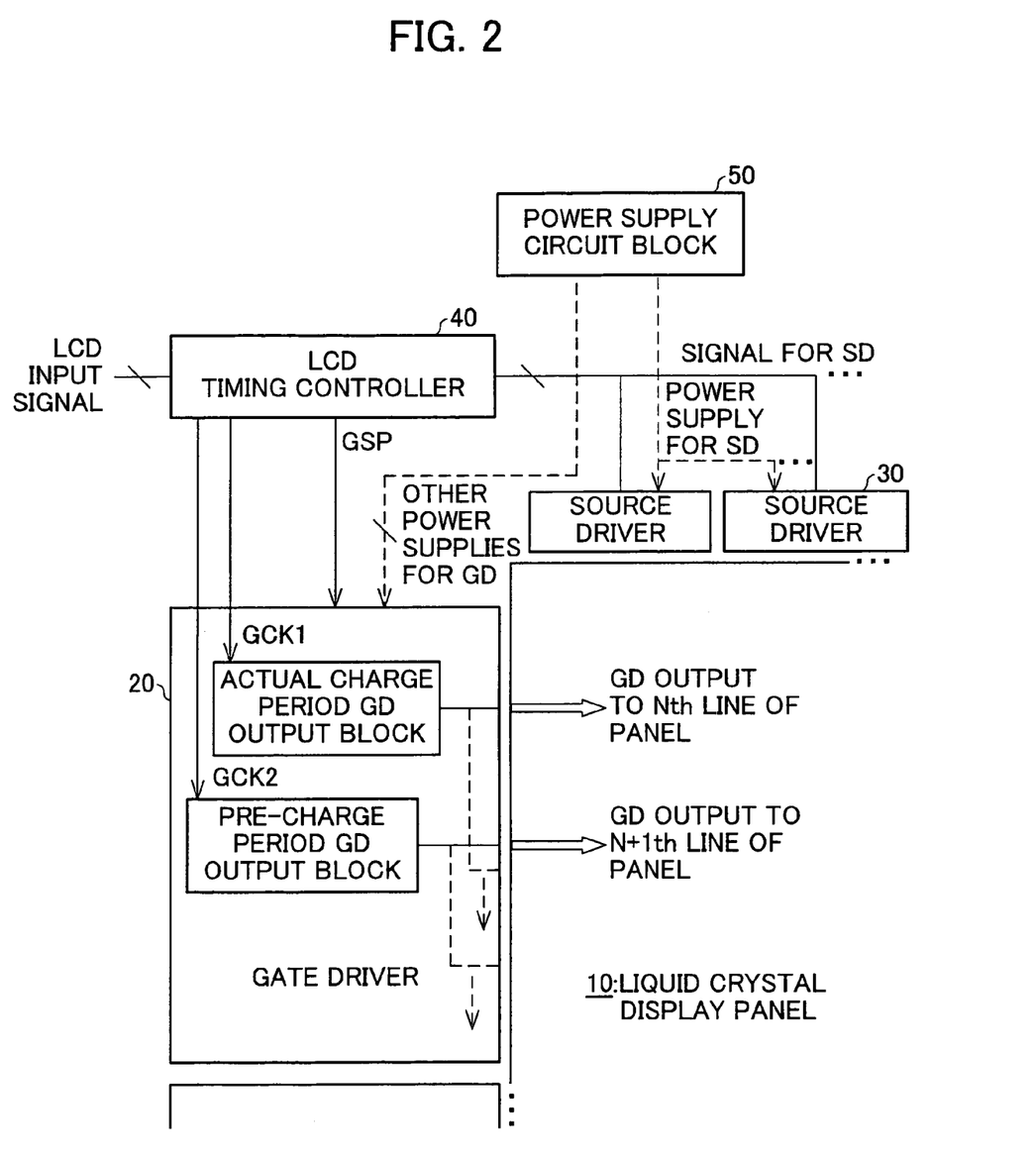
FIG. 2 is a block diagram schematically showing a structure of the liquid crystal display.

As illustrated in FIG. 2, a liquid crystal display embodying the present invention includes a liquid crystal display panel 10, a gate driver 20, a source driver 30, an LCD timing controller 40, and a power supply circuit block 50.

The liquid crystal display panel 10 is a regular TFT liquid crystal display panel in which a plurality of gate lines and source lines are disposed intersecting each other, and a pixel is connected through TFT at each intersection of gate lines and source lines. Note that, in FIG. 2, the gate lines, source lines, TFTs and pixels are omitted from the liquid crystal display panel 10.

The gate driver 20 provides a scanning signal to a gate of each TFT through the gate lines. The source driver 30 provides a data signal to the pixels through the source lines and TFTs. The gate driver 20 and the source driver 30 can be used to drive a larger number of gate lines or source lines by connecting a plurality of drivers in a cascade connection.

The LCD timing controller 40 receives LCD input signals, including GSP (a gate start pulse signal), GCK1 (a gate clock signal), SSP (a source start pulse signal), SCK (a source clock signal) and a data signal. The LCD timing controller 40 outputs GSP and GCK1 to the gate driver 20. The LCD timing controller outputs SSP, SCK and a data signal to the source driver 30. Further, the LCD timing controller 40 generates GCK2 (a gate clock signal) using the data signal, and outputs GCK2 to the gate driver 20.

The power supply circuit block 50 supplies input power for GD (gate driver) to the gate driver 20, and input power for SD (source driver) to the source driver 30.

The liquid crystal display carries out "gate-jumping two pulse driving" using GCK1 and GCK2 which are supplied to the gate driver 20. Here, GCK1 is a clock signal for controlling a gate output for a target line being actually charged. As with a conventional GCK, the GCK1 is a pulse signal with a constant cycle. GCK2 is also a clock signal for controlling a gate output for a target line being pre-charged.

The liquid crystal display controls the duty of a pre-charge period by making the pulse width of GCK2 variable for each target line, so as to prevent the conventional overcharge that occurs in a pre-charge period.

Figure 1:
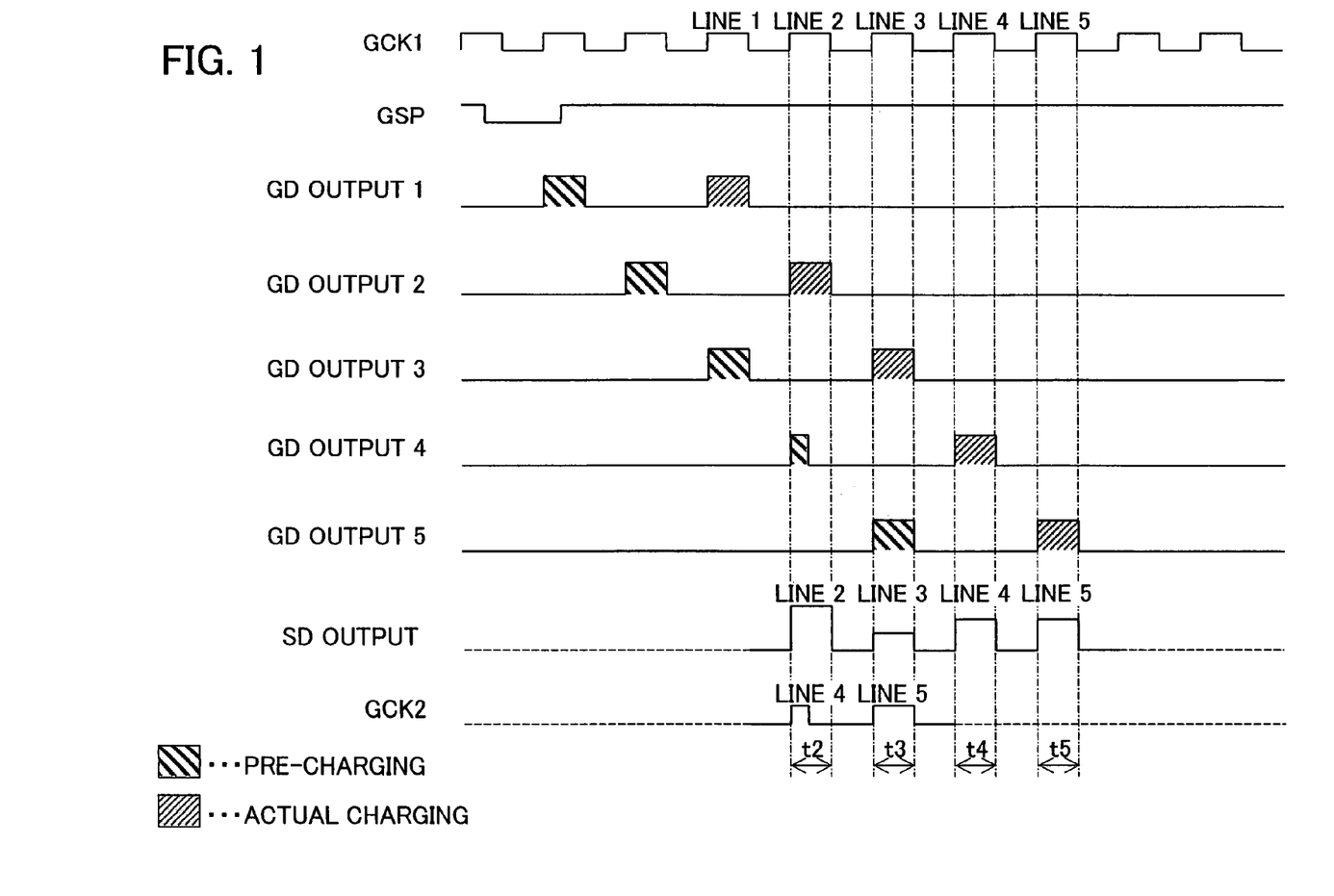
FIG. 1 is a timing chart representing a driving method of a liquid crystal display in one embodiment of the present invention.

Referring to FIG. 1, a basic principle of a driving method of the liquid crystal display is explained below. In FIG. 1, the driving method is explained by considering only one particular source line.

In FIG. 1, the GD output n indicates an output pulse to an nth gate line. For each GD output, a pulse period for actual charging is set by GCK1, and a pulse period for pre-charging is set by GCK2.

In FIG. 1, the SD output is an output for the source line of concern, and provides a gray scale display level to each pixel. Each pulse in the SD output corresponds to a gray scale display level of a pixel connected to the gate line being actually charged. Note that, the pulses shown in FIG. 1 correspond to only the second to fifth gate lines (lines 2 to 5), and pulses corresponding to other lines are omitted.

The following considers an actual charging period (t2) for the second gate line. In this actual charging period, pre-charging is carried out for the fourth gate line at the same time. The pre-charging for the fourth gate line is carried out at a voltage corresponding to a gray scale display level of a pixel connected to the second gate line.

Comparing the charge voltage of pre-charging (pulse voltage of SD output in t2) for the fourth gate line and the charge voltage of actual charging (pulse voltage of SD output in t4) of the fourth gate line, the charge voltage for pre-charging is higher. It is apparent from this that overcharge will result if the pre-charging for the fourth gate line were carried out at the same maximum duty as in the actual charging.

To prevent such overcharging in pre-charging, in the liquid crystal display of the present embodiment, the duty of the pre-charging pulse in the GD output for the fourth line is adjusted. Namely, during time t2 in which pre-charging is carried out for the fourth line, a pulse width of GCK2 for setting a pre-charge period is shortened. (Note that, FICA illustrates pulses only for the fourth and fifth gate lines (lines 4 to 5), and pulses for other lines are omitted.) This prevents overcharge due to pre-charging, even when the charge voltage for pre-charging is higher than the charge voltage for actual charging.

The following considers the fifth gate line. Comparing the charge voltage of pre-charging (pulse voltage of SD output in time t3) and the charge voltage of actual charging (pulse voltage of SD output in time t5), the charge voltage of actual charging is higher. In this case, it is unnecessary to shorten the pre-charge period, because overcharging does not occur even when the pre-charging is carried out at the same maximum duty as in the actual charging (it is possible to carry out pre-charging at the maximum duty).

It should be noted, however, that this applies when only one particular source line is considered. Namely, in an actual liquid crystal display, there are multiple source lines intersecting each gate line. (Multiple pixels are connected to each gate line.) Therefore, when pre-charging is carried out at the maximum duty for a certain gate line, it is perfectly possible that overcharging occurs in a pixel connected to a certain source line while it does not occur in pixels of other source lines. In this case, it is necessary to adjust the duty of a pre-charge period so as to prevent overcharging in all pixels. In other words, pre-charging can be carried out at the maximum duty only when the following relation is satisfied by all pixels connected to a certain gate line:

(actual charge voltage)≧(pre-charge voltage).

By adjusting the duty of a pre-charge period to prevent overcharge in all pixels, the pre-charge period also becomes shorter in pixels in which overcharging does not occur even at the maximum duty. However, even in such pixels, pre-charging helps to achieve the supposed voltage faster, even though the extent of the effect may differ from one pixel to another. Therefore, the "gate-jumping two pulse driving" is effective in providing better resolution and improving response speed.

Figure 3:
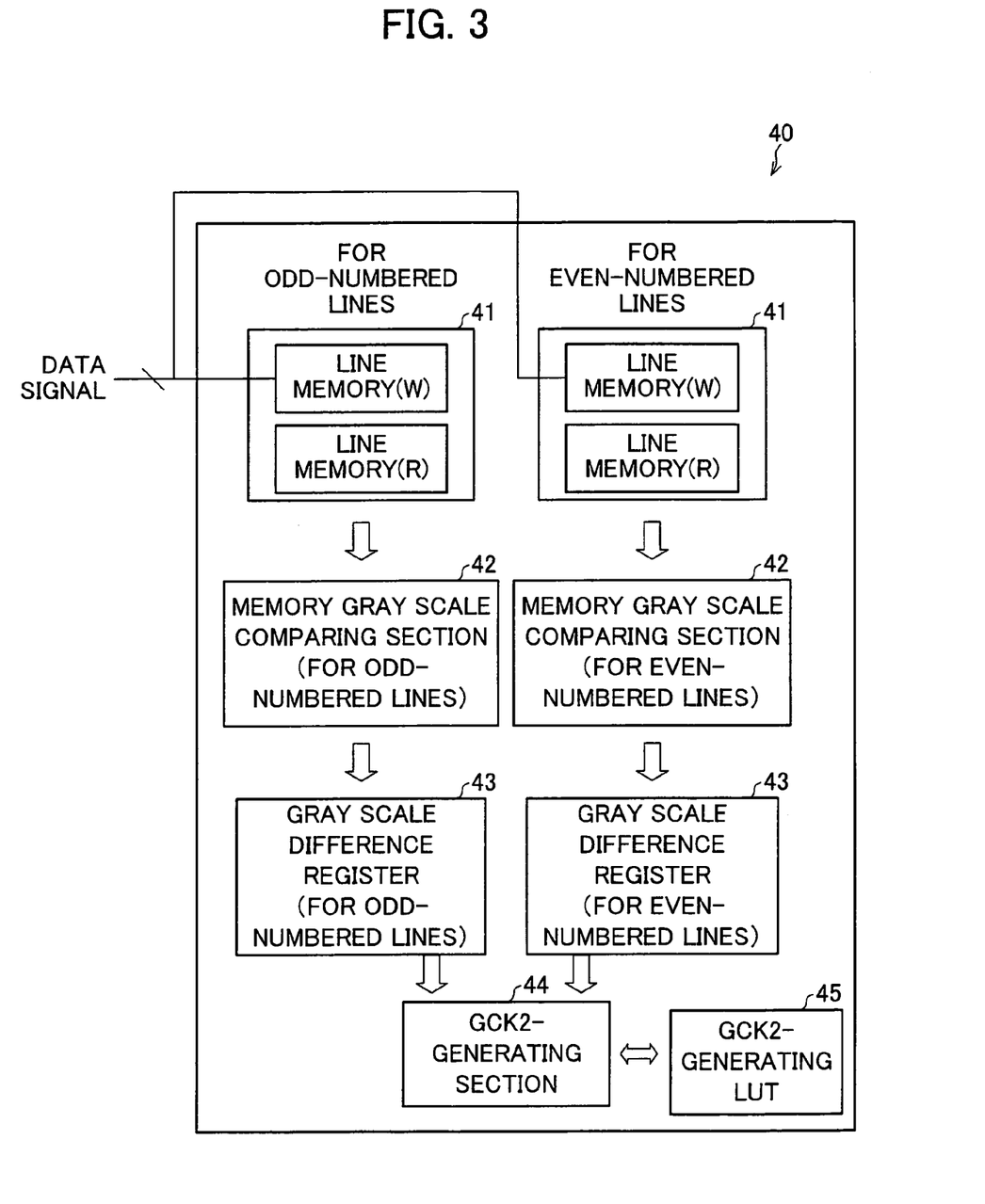
FIG. 3 is a block diagram schematically showing a structure of a LCD timing controller of the liquid crystal display.
Figure 5:
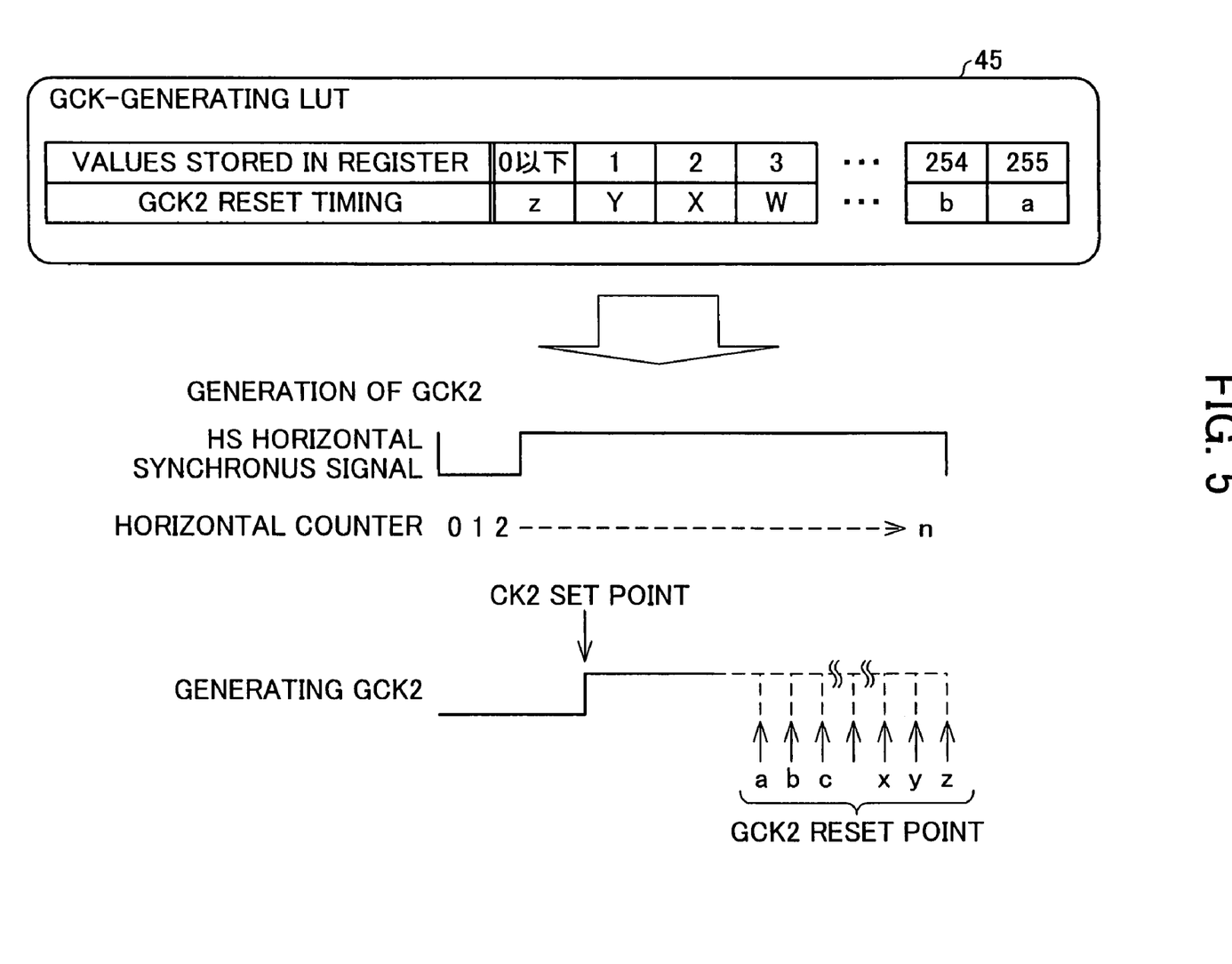
FIG. 5 is a diagram illustrating how GCK2 is generated in the LCD timing controller.

Next, referring FIGS. 3 and 5, a method to generate GCK2 in the LCD timing controller 40 is explained.

As illustrated in FIG. 3, the LCD timing controller 40 includes a line memory 41 for two lines, a memory gray scale comparing section 42, a gray scale difference register 43, a GCK2-generating section 44, and a GCK2-generating LUT 45 (Look Up Table). The line memory 41, the memory gray scale comparing section 42, the gray scale difference register 43 are provided in two sets, one for the odd-numbered lines and one for the even-numbered lines.

In the LCD input signals that are input into the LCD timing controller 40, the data signal is written in the line memory 41 for data of one line. Here, data signals for odd-numbered lines are written in the line memory 41 for odd-numbered lines, and data signals for even-numbered lines are written in the line memory 41 for even-numbered lines. Because the line memory 41 has a storage area for two lines, a data signal of the latest line and a data signal of the line two lines before are always stored in each of the line memories 41 for odd-numbered lines and even-numbered lines. This makes it possible to compare data of the two lines.

Figure 4:
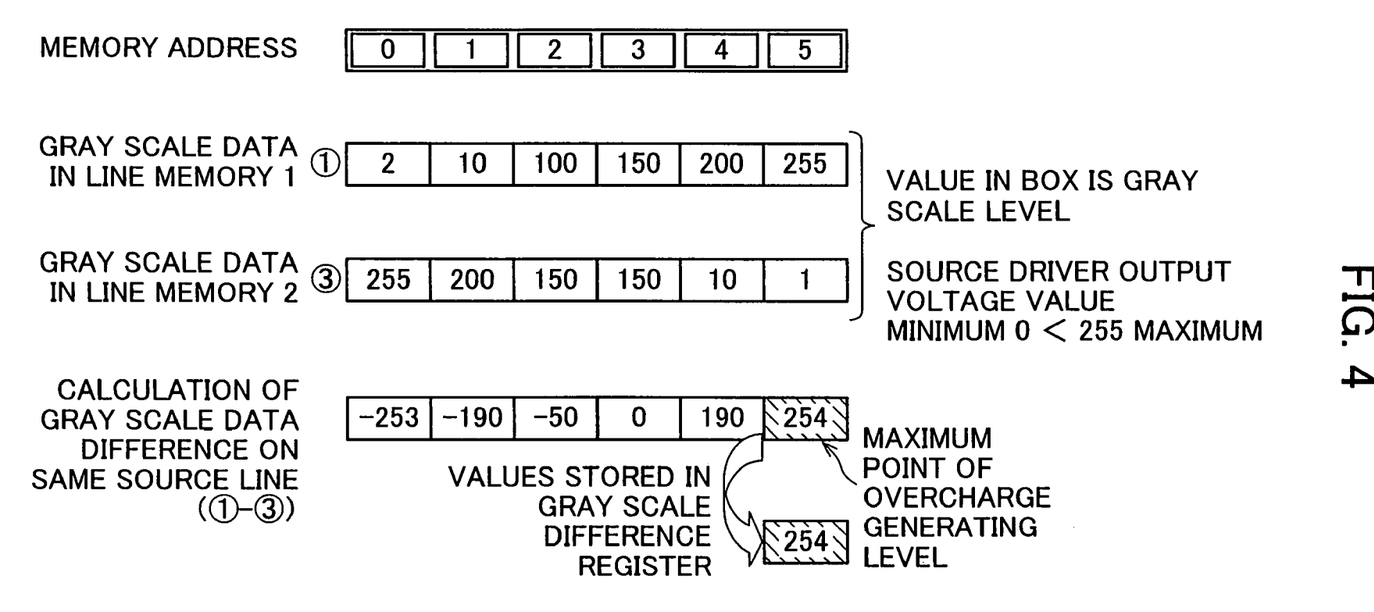
FIG. 4 is a diagram comparing lines in the LCD timing controller.

The comparison of the data signal of the latest line and the data signal of the line two lines before is carried out in the memory gray scale comparing section 42. The operation of comparing data is explained as follows, referring to FIG. 4. In FIG. 4, it is assumed that a line memory 1 stores a data signal of the line two lines before, and that a line memory 2 stores a data signal of the latest line. Further, for simplicity, one line is assumed to have six data (six source lines intersect one gate line).

In the memory gray scale comparing section 42, the difference between data (a gray scale level) of the line two lines before and data (a gray scale level) of the latest line on the same source line is calculated. A difference of gray scale data is calculated for all source lines. In the example illustrated in FIG. 4, the difference values corresponding to the source lines of addresses 0 to 3 are 0 or less. Thus, in these source lines, the amount of charge stored in the latest gate line storing the data signal is greater for the gray scale level of the actual charging than for the gray scale level of the pre-charging. This means that overcharging will not occur in the pre-charged line.

On the other hand, difference values corresponding to the source lines of addresses 4 and 5 are 190 and 254. In these source lines, the amount of charge stored in the latest gate line storing the data signal is less for the gray scale level of the actual charging than for the gray scale level of the pre-charging. Further, because the difference value 254 corresponding to the source line of address 5 is greater, the maximum overcharge caused by pre-charging carried out at the maximum duty occurs at the pixel corresponding to the source line of address 5. The difference value that causes the maximum overcharge is stored in the gray scale difference register 43.

To explain more specifically, between two gate lines, the memory gray scale comparing section 42 carries out pixel-wise comparison of gray scales on the same source line. The comparison is carried out successively from the first address to the last address. The difference in gray scale level calculated by comparison for the first address is stored in the gray scale difference register 43. The differences in gray scale level of the subsequent addresses are compared one after another with the gray scale difference currently stored in the gray scale difference register 43. When the compared value is greater than the stored gray scale difference, the stored value in the gray scale difference register 43 is updated. In this way, at the end of comparison of the gray scale levels for all addresses or all source lines, the largest gray scale level difference in the compared two lines is stored in the gray scale difference register 43.

When the comparison of gray scale levels between the compared two lines is finished, the GCK2-generating section 44 sets a pulse width of GCK2, so as to prevent overcharging in a pre-charge period of a target line. This is carried out by using the overcharge-causing maximum difference value stored in the gray scale difference register 43, and the GCK2-generating LUT 45. Referring to FIG. 5, a setting method is explained below.

As is illustrated in FIG. 5, the GCK2-generating LUT 45 stores stored values of the register (that is, overcharge-causing maximum difference values stored in the gray scale difference register 43), and reset timings of GCK2, respectively corresponding to each other. The GCK2 reset timing is given, for example, according to the clock count in a reference clock.

In the GCK2 generated in the GCK2-generating section 44, a charge time (pulse period) for each gate line is set using a horizontal synchronous signal HS and a reference clock. To be more precise, the reference clock starts counting (horizontal counter) in response to an input of a horizontal synchronous signal, and a start point of a GCK2 pulse (GCK2 SET point) is set when the counter reaches a predetermined count (a fixed value).

The end point of the GCK2 pulse (GCK2 RESET point) is set using a GCK2 reset timing read from the GCK2-generating LUT 45. In the example illustrated in FIGS. 4 and 5, the count value for the GCK2 reset timing is b, because the overcharge-causing maximum difference value stored in the gray scale difference register 43 is 254.

Note that, in the foregoing operation of the GCK2-generating section 44, the start point of the GCK2 pulse is fixed and the end point is variable. On the other way around, it also works to make the start point variable and the end point fixed.

Figure 6:
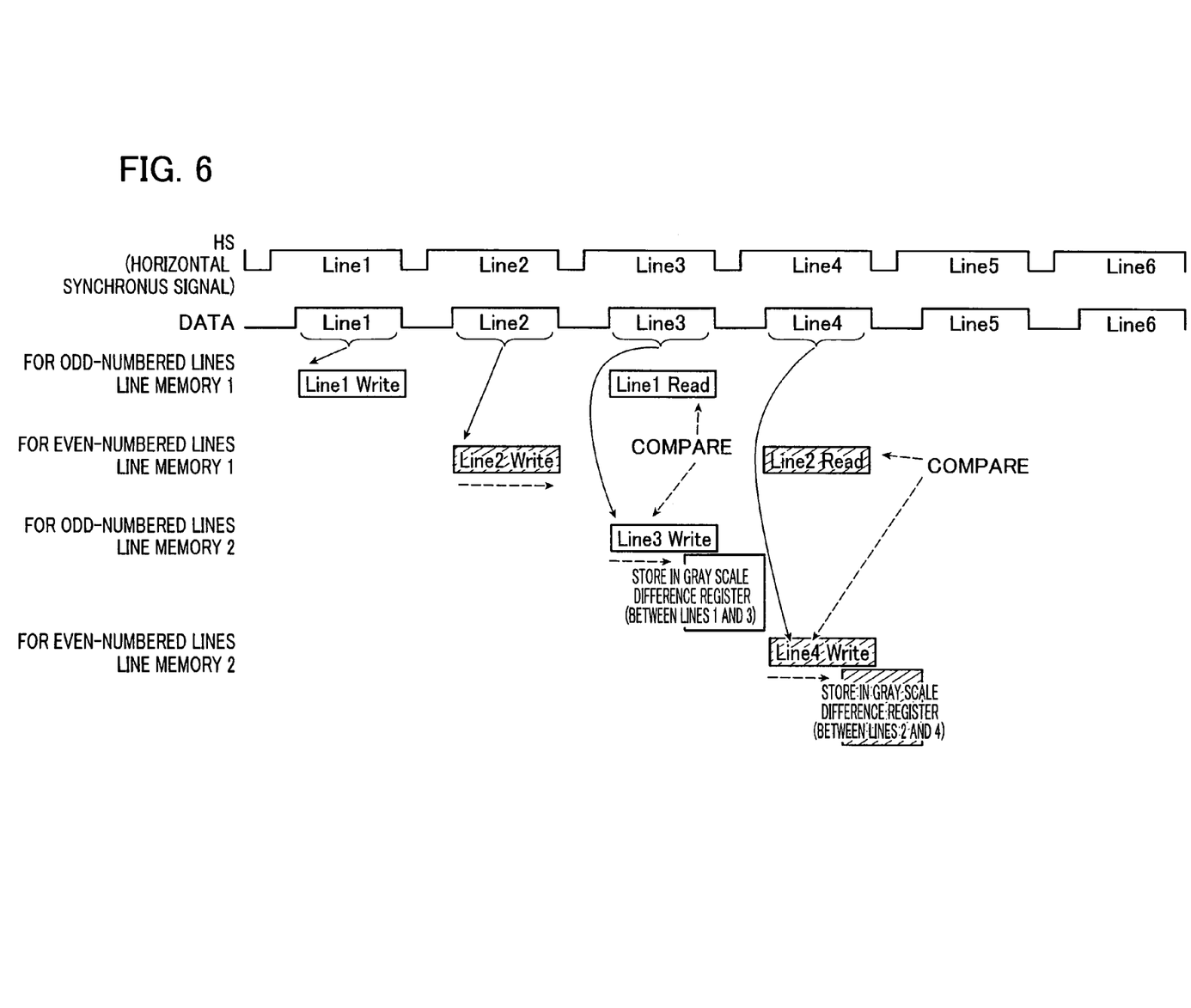
FIG. 6 is a timing chart representing operation timings of the LCD timing controller.
Figure 7:
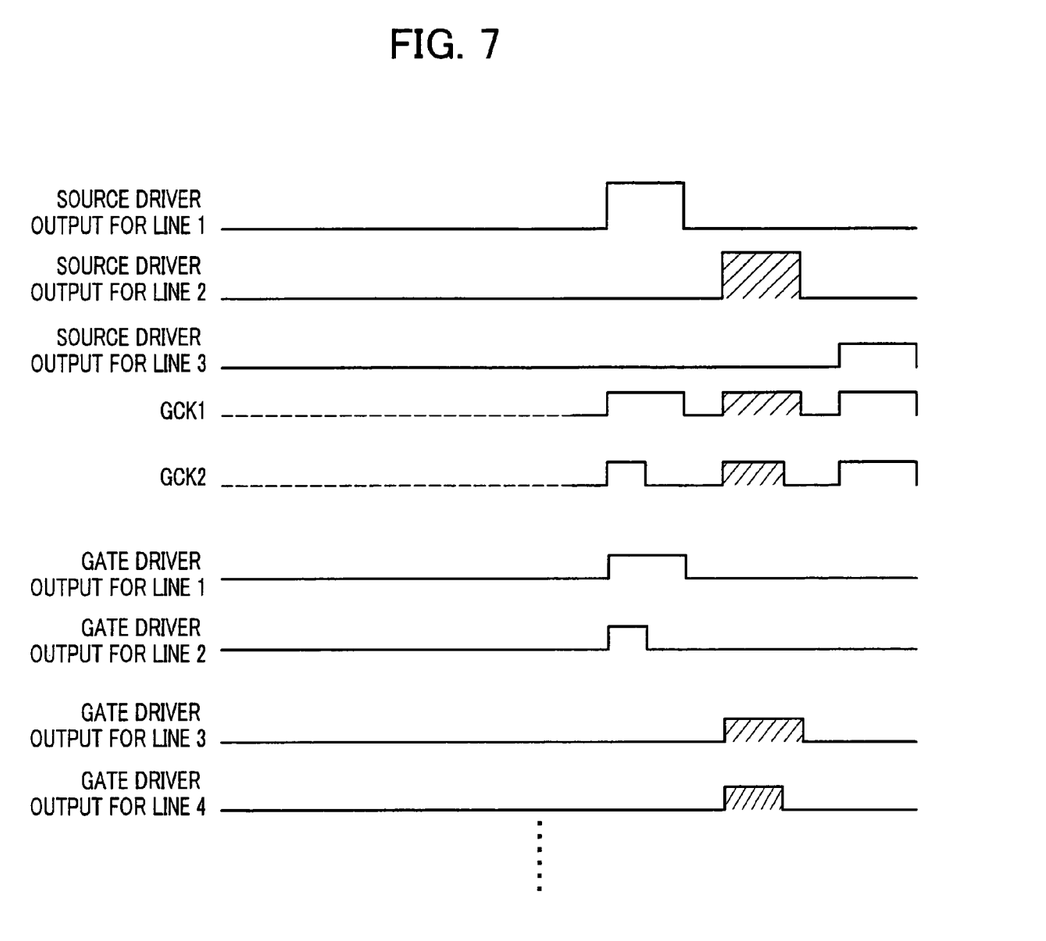
FIG. 7 is a waveform diagram representing operation timings of the LCD timing controller.

As understood by the explanation above, pre-charging for a given gate line is carried out at the same time as the actual charging for the line two lines before. However, at this time, the duration of the pre-charge period cannot be determined until data for the pre-charged line is supplied. Referring to FIGS. 6 and 7, the following describes operation timings of the respective processes carried out by the LCD timing controller 40.

First, during a time period in which data for line 1 is input to the LCD timing controller 40, the data for line 1 is written in the line memory 41 for odd-numbered lines (in one of the line memory spaces for two lines). During a time period in which data for line 2 is input, the data for line 2 is written in the line memory 41 for even-numbered lines.

Next, during a time period in which data for line 3 is input to the LCD timing controller 40, the data for line 3 is written in the line memory 41 for odd-numbered lines (in the other line memory space in which the data for line 1 is not written). At the same time, the data for line 3 is compared with the data for line 1 that has been already stored. Accordingly, at the time when the writing of the data for line 3 in the line memory 41 is finished, the gray scale difference register 43 is storing the overcharge-causing maximum difference value obtained by the comparison of the data for line 1 and the data for line 3.

In the same way, during a time period in which data for line 4 is input to the LCD timing controller 40, the data for line 4 is written in the line memory 41 for even-numbered lines, and the data for line 2 and the data for line 4 are compared.

Further, during a time period in which the data for line 4 is written in the LCD timing controller 40, GCK1 for carrying out actual charging to line 1, and GCK2 for carrying out pre-charging to line 3 are output to the gate driver, and the line 1 data stored in the line memory 41 is output to the source driver. At this time, a pulse width of GCK2 for carrying out pre-charging to line 3 can be determined because the difference value obtained by the comparison of the data for line 1 and data for line 3 has already been stored in the gray scale difference register 43.

By repeating these processes in order, the "gate-jumping two pulse driving" of the present invention can be carried out. For lines 1 and 2, pre-charge is carried out during the actual charge periods of the last two lines of a preceding frame.

As described above, in a liquid crystal display of the present embodiment, actual charging for a current line and pre-charging for a subsequent line of the current line are carried out during one horizontal period, and the liquid crystal display includes: a pre-charge period adjusting section for comparing data respectively applied to the actually charged line and the pre-charged line which are charged in the same horizontal period, and adjusting a pre-charge period of the pre-charged line based on a result of the comparison.

As mentioned above, in a driving method in which actual charging for a current line and pre-charging for a subsequent line (any line following the actually charged line) are carried out during one horizontal period, a pixel is charged twice by pre-charging and actual charging. Though the driving method is effective in improving a resolution and response speed of the liquid crystal display in TFT liquid crystal driving, it can cause uneven gray scale display by the overcharge due to pre-charging.

To solve the problem, in the structure mentioned above, data respectively applied to the actually charged line and the pre-charged line which are charged in the same horizontal period are compared (a charge level of pre-charging and a charge level of actual charging are compared with respect to the same pixel), and a pre-charge period of the pre-charged line is adjusted based on the result of comparison. To be precise, the adjustment of a pre-charge period reduces the pre-charge period and thereby avoid overcharge in pixels which are likely to be overcharged by pre-charging. This effectively improves a resolution and response speed of the liquid crystal display while preventing uneven gray scale display caused by overcharge due to pre-charging.

The liquid crystal display may be adapted to include: a storing section for storing data supplied to a current line, and holding the data until there is an input of data to a subsequent line which is pre-charged at the same time as the actual charging of the current line; a comparing section for comparing, based on the stored data in the storing section, data respectively applied to the actually charged line and the pre-charged line which are charged in the same horizontal period; and a setting section for reducing the pre-charge period so as to prevent overcharge in all pixels of the pre-charged line, when a result of comparison by said comparing section finds that a greater charge is required for a pixel on the actually charged line than for a pixel on the pre-charged line.

Further, the liquid crystal display may be adapted so that the comparing section compares data between pixels of the same source line for all pixels of the two lines being compared, and detects a pixel in which a charge level of the actual charging exceeds a charge level of the pre-charging with a greatest level difference; and the setting section sets a pre-charge period based on a setting parameter, which is a pre-charge period setting parameter corresponding to the level difference detected by said comparing section and is read from a table which stores the level difference, and, the setting parameter in a corresponding manner beforehand.

With the foregoing structure, the pre-charge period adjusting means can be specifically implemented.

Further, in a liquid crystal display of the present embodiment, actual charging of a current line and pre-charging of a subsequent line of the actually charged line are carried out during one horizontal time, wherein two kinds of clock signals, a first clock signal for setting an actual charge period for each line, and a second clock signal for setting a pre-charge period for each line, are used to drive a gate line, and wherein a pulse width of the second clock signal is adjusted for every driving of a gate line, so as to bring about a corresponding change in the pre-charge period.

With the structure mentioned above, the charge period is controlled by using different gate clock signals for the actually charge line and pre-charged line of the same horizontal period. Thus, the amount of charge for the actually charged pixel and pre-charged pixel connected to the same source line can be independently controlled without increasing the number of source lines. This is effective in improving a resolution and response speed of the liquid crystal display while preventing uneven gray scale display caused by overcharge due to pre-charging.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display in which charging of a current line and pre-charging of a subsequent line are carried out during one horizontal period, the liquid crystal display comprising:
    a pre-charge period adjusting section to compare data applied to a charged line with data applied to a pre-charged line which are charged in a same horizontal period, and to adjust the pre-charge period of the pre-charged line based on a result of the comparison, with an ON period of a scanning signal provided to the pre-charged line based on a data signal used by the charged line.

2. The liquid crystal display as in claim 1, wherein the pre-charge period adjusting section includes:
    a storing section to store data supplied to a current line, and hold the stored data until there is an input of subsequent data to a subsequent line which is pre-charged at a same time as a charging of the current line;

a comparing section to compare the stored data in the storing section and the subsequent data respectively applied to the charged line and the pre-charged line which are charged in a same horizontal period; and a setting section to reduce a pre-charge period so as to prevent overcharge in all pixels of the pre-charged line, when a result of comparison by the comparing section finds that a greater charge is required for a pixel on the charged line than for the pixel on the pre-charged line.

3. The liquid crystal display as in claim 2, wherein the comparing section is useable to compare data between pixels of a same source line for all pixels of two lines being compared, and to detect a pixel in which a charge level of the pre-charging exceeds a charge level of the actual charging with a greatest level difference, and wherein the setting section is usable to set a pre-charge period based on a setting parameter, which is a pre-charge period setting parameter corresponding to the level difference detected by the comparing section and is read from a table which stores the level difference and the setting parameter in a corresponding manner beforehand.

4. A driving method of a liquid crystal display in which charging of a current line and pre-charging of a subsequent line are carried out during one horizontal period, the driving method comprising:

comparing data applied to the charged line with data applied to the pre-charged line which are charged in the same horizontal period, and adjusting a pre-charge period of the pre-charged line based on a result of the comparison, with an ON period of a scanning signal provided to the pre-charged line based on a data signal used by the charged line.

5. A liquid crystal display in which charging of a current line and pre-charging of a subsequent line are carried out during one horizontal period, the liquid crystal display comprising:

means for comparing data applied to a charged line with data applied to a pre-charged line which are charged in a same horizontal period, and means for adjusting a pre-charge period of the pre-charged line based on a result of the comparison, with an ON period of a scanning signal provided to the pre-charged line based on a data signal used by the charged line.

6. The liquid crystal display as in claim 5, wherein the pre-charge period adjusting section includes:

means for storing data supplied to a current line and for holding the stored data until there is an input of subsequent data to a subsequent line which is pre-charged at a same time as a charging of the current line;

means for comparing the stored data and the subsequent data respectively applied to the charged line and the pre-charged line which are charged in a same horizontal period; and means for reducing a pre-charge period so as to prevent overcharge in all pixels of the pre-charged line, when a result of comparison by the means for comparing finds that a greater charge is required for a pixel on the charged line than for the pixel on the pre-charged line.

7. The liquid crystal display as in claim 6, wherein the means for comparing is useable to compare data between pixels of a same source line for all pixels of two lines being compared, and to detect a pixel in which a charge level of the pre-charging exceeds a charge level of the actual charging with a greatest level difference, and wherein the means for reducing a pre-charge period is usable to set a pre-charge period based on a setting parameter, which is a pre-charge period setting parameter corresponding to the level difference detected by the means for comparing and is read from a table which stores the level difference and the setting parameter in a corresponding manner beforehand.

8. A driving method of a liquid crystal display in which charging of a current line and pre-charging of a subsequent line are carried out during one horizontal period, the driving method comprising:

means for comparing data applied to a charged line with data applied to a pre-charged line which are charged in a same horizontal period, and means for adjusting a pre-charge period of the pre-charged line based on a result of the comparison, with an ON period of a scanning signal provided to the pre-charged line based on a data signal used by the charged line.

* * * * *